United States Patent
Isnard et al.

(10) Patent No.: US 6,745,141 B2
(45) Date of Patent: Jun. 1, 2004

(54) METHOD FOR REPORTING THE TIME DISTRIBUTION OF A SUCCESSION OF EVENTS

(75) Inventors: Olivier Isnard, Viroflay (FR);
Jean-Marie Calmel, Versailles (FR);
Laurent Pison, Jouars Pontchartrain (FR)

(73) Assignee: Nortel Networks Limited (CA)

( * ) Notice: Subject to any disclaimer, the term of this patent is extended or adjusted under 35 U.S.C. 154(b) by 221 days.

(21) Appl. No.: 10/138,596

(22) Filed: May 3, 2002

(65) Prior Publication Data

US 2002/0188420 A1 Dec. 12, 2002

(30) Foreign Application Priority Data

May 16, 2001 (FR) .......................... 01 06453

(51) Int. Cl.$^7$ .............................................. G06F 19/00
(52) U.S. Cl. ......................................... 702/79; 702/78
(58) Field of Search .................. 702/79, 78; 368/119; 379/127.01; 340/941; 370/230; 705/10; 341/123; 701/117; 700/14

(56) References Cited

U.S. PATENT DOCUMENTS

| | | | |
|---|---|---|---|
| 4,678,345 A | * 7/1987 | Agoston | 368/119 |
| 4,837,705 A | * 6/1989 | Mussler et al. | 702/78 |
| 5,243,343 A | * 9/1993 | Moriyasu | 341/123 |
| 5,247,297 A | * 9/1993 | Seabury et al. | 340/941 |
| 5,541,835 A | * 7/1996 | Dextraze et al. | 705/10 |
| 5,914,936 A | * 6/1999 | Hatono et al. | 370/230 |
| 5,999,877 A | * 12/1999 | Takahashi et al. | 701/117 |
| 6,173,207 B1 | * 1/2001 | Eidson | 700/14 |
| 2001/0010717 A1 | * 8/2001 | Goto et al. | 379/127.01 |

OTHER PUBLICATIONS

Daponte P et al., "Data Acquisition systems for non periodic signal with Real–Time Data Compression", Measurement, Institute of Measurement and Control. London, Great–Britain, vol. 27, No. 3, pp. 145–158, Apr. 2000.
Cozzani I et al., "A Passive Test and Measurement System: Traffic Sampling for QoS Evaluation", Global Telecommunications Conference, 1998. GLOBECOM 1998. The Bridge to Global Integration. IEEE Sydney, NSW Australia Nov. 8–12, 1998, Piscataway, NJ, USA, pp. 1236–1241.
Varkonyi–Koczy A et al., "A Fast Filter–Bank for Adaptative Fourier Analysis" IEEE Instrumentation and Measurement Technology Conference, 1998. IMTC/98. Conference Proceedings. IEEE St. Paul, MN, USA, May 18–21, 1998, NY, USA, pp. 915–918.

* cited by examiner

Primary Examiner—John Barlow
Assistant Examiner—Xiuqin Sun
(74) Attorney, Agent, or Firm—Piper Rudnick LLP (57) ABSTRACT

To report the time distribution of a succession of specified events such as occurrences of particular data elements in telecommunications equipment, the method comprises an initialization of a sampling quantity consisting of a positive integer and several successive iterations of a scheme comprising the following steps: detection of a number of events equal to the sampling quantity and metering of a sampling time taken to detect said number of events; quantization of the sampling time metered in the previous step so as to output coding data representing a quantized value of the metered sampling time; and updating of the sampling quantity as a function of parameters including the quantized value of this sampling time.

30 Claims, 5 Drawing Sheets

METHOD FOR REPORTING THE TIME DISTRIBUTION OF A SUCCESSION OF EVENTS

BACKGROUND OF THE INVENTION

The present invention relates to techniques for detecting and sampling events occurring repetitively.

It finds a particular, non-exclusive application in operation, administration and maintenance (OAM) facilities with which certain telecommunications equipment is equipped.

A large number of data elements circulate in telecommunications networks. Analysis of the occurrences of specified types of data elements is useful to the operators for improving or optimizing the operation of their networks and for detecting any malfunctions therein.

By way of example, in an ATM ("Asynchronous Transfer Mode") network, the data elements whose occurrences are analyzed may be the ATM cells transmitted along a particular virtual connection, thereby making it possible to analyze the bit rate behavior of the source of the cells and/or the response of the network with regard to this source.

As another exemplary application of the invention, mention may be made of protocol analyzers. The relevant data elements may then correspond to particular type messages of a signaling protocol.

During the deployment of a network, the configuring of the equipment allows it a priori to meter the occurrences of various types of data elements. It is merely necessary to make provision for the appropriate software resources in this equipment. The elements to be detected in a given situation are defined by means of the OAM facilities of the network, which activate the software resources in question and then collect the results of the observations.

The customary observation mechanisms are based on counters which cater for operations such as enumeration of events over given periods, calculation of aggregate values, averages, minima, maxima, etc. Although they provide interesting information, these counters do not make it possible to evaluate a traffic profile over a given observation period. In particular, they do not make it possible to evaluate the more or less bursty nature of the traffic observed. For example, it is quite obvious that the traffic profiles illustrated, in arbitrary units, by the curves of FIGS. 1 and 2 correspond to very different behaviors of the network, although they give rise to similar values for the maximum value (MAX) and the average value (AVE) of the observed traffic load.

To evaluate a traffic profile, i.e. the time distribution of the events detected over a given observation period, use is customarily made of a sampling method consisting in recording the number $k_i$ of events occurring during a given time unit. For example, a byte is used every millisecond to record the number of events detected in the course of the previous millisecond. The time unit adopted is fixed before the start of the observation period, as is the number of bits employed for recording each number of events. A drawback of this method is that zeros are recorded needlessly when the traffic observed has regions of silence.

In another sampling method, the sampling quantity (number of events detected) is constant, i.e. $k_1=k_2=\ldots=k$, and the data recorded represent the sampling times $T_i$ taken to detect k new occurrences of the event. This method prevents the sampling from generating data in the regions of silence. It generally involves an approximation when the times metered are represented in the form of integers.

The two above-mentioned methods do not behave satisfactorily in the presence of large variations in the rate of the detected events. With the first method, an increase in the rate may cause overflow because the space provided for recording the number $k_i$ may become insufficient, while an increase in this space increases the needless consumption of memory or of bandwidth in the regions of silence. With the second method, an increase in the rate involves the production of abundant data for representing short sampling times. In both cases, the volume of data generated by the sampling method is not optimal.

This type of traffic profile analysis thus poses difficulties when it pertains to the time distribution of very frequent occurrences. The relevant data elements are typically manipulated by a processor or by logic circuits supervised by a processor. The enumeration of their occurrences and the coding of the data $k_i$ or $T_i$ are carried out by this processor. The coding data being relatively abundant, they are often stored in a local memory before being transmitted for analysis. The processor is then invoked to write the data to disk as it goes along and then to read them and transmit them to a remote OAM server. The coding data produced therefore mobilize considerable resources of the processor (CPU time) in order to be written to disk and then read therefrom and/or transmitted. However, the resources of the processor are relatively valuable, especially in the case where the events taken into account are very frequent since the processor's performance constraints are then more severe.

An object of the present invention is to remedy the above difficulties by proposing an efficient sampling method making it possible to control the amount of data generated in reporting the observations.

SUMMARY OF THE INVENTION

The invention thus proposes a method for reporting the time distribution of a succession of specified events, comprising an initialization of a sampling quantity consisting of a positive integer and a plurality of successive iterations of a scheme comprising the steps of:

detecting a number of events equal to the sampling quantity and metering a sampling time taken to detect said number of events;

quantizing the sampling time metered in the preceding step to output coding data representing a quantized value of said sampling time; and updating the sampling quantity as a function of parameters including said quantized value of the sampling time.

The method uses sampling quantities $k_{i+1}$ adaptable as a function of the quantized values of the sampling times $T_i$ previously observed (i=1, 2, 3, . . . ).

The instantaneous rate of the detected events is thus taken into account, implicitly or explicitly, whereby the variations in this rate are properly tracked. When this rate is low, $k_i$ is taken relatively high. When it increases, the update decreases the quantity $k_i$. This allows a certain predictability of the sampling time $T_i$, and hence efficient coding of this parameter, so that the amount of coding data generated by the method is controlled.

The OAM server, which processes the coding data, is capable of initializing the sampling quantity $k_1$ in the same way as the sending unit which detected the events. It associates therewith the quantized value $t_1$, recovered based on the coding data, of the first sampling time $T_1$ and it deduces therefrom the sampling quantity $k_2$ through the same updating relation which was used by the sending unit. By recurrence, the i-th coding data define a quantized value $t_i$ of the sampling time $T_i$ and make it possible to calculate $k_{i+1}$. The successive reading of the coding data thus allows the OAM server to determine all the pairs $(k_i, t_i)$ which, according to requirements, may be reprocessed to produce traffic histograms (with a constant time step) with small approximations, or to calculate all kinds of statistical quantities (average, variance, minima, maxima, etc.).

In a particular implementation of the method, an event rate is estimated explicitly in each iteration of the scheme. The updating of the sampling quantity then comprises the calculation of an estimated event rate as a function of parameters including the preceding sampling quantity and the quantized value of the sampling time. The updated sampling quantity is subsequently deduced from the estimated rate.

The updated sampling quantity is typically an integer substantially proportional to the estimated event rate. This integer can in particular be $[Z.\lambda.n/S]$, where Z is a predefined total duration of observation, $\lambda$ is the estimated event rate, n is a number of bits used to form the coding data representing a quantized time value, S is a predefined data size expressed as a number of bits. In the above notation, for a number y, $\lceil y \rceil$ represents the integer equal to or immediately greater than y.

The estimated event rate is advantageously calculated in the form $(1-x).\lambda+x.K/t$, where x is a weighting coefficient lying between 0 and 1, $\lambda$ is the estimated event rate in force before the current iteration, K is the preceding sampling quantity and t is the quantized value of the sampling time of the current iteration.

The number x makes it possible to select the sensitivity of the rate estimator. A value close to zero restricts the variations in $\lambda$ and hence the adaptive nature of the method, while a value close to 1 can cause abrupt variations of the estimator.

In an advantageous embodiment of the method, the quantization of the sampling time comprises the production of coding data including at least one index of n bits, n being a predefined integer larger than 3, and the production of these coding data comprises the steps of:

determining a prediction time interval;

if the sampling time is below the prediction interval, outputting an index having a first value and replacing the prediction interval by a new time interval situated immediately below the preceding interval;

if the sampling time is above the prediction interval, outputting an index having a second value distinct from the first value and replacing the prediction interval by a new time interval situated immediately above the preceding interval; and if the sampling time is within the prediction interval, outputting an index having a value distinct from the first and second values and representative of the position of the sampling time in the prediction interval.

The prediction time interval initially determined is typically positioned with respect to a prediction value equal to the ratio of the sampling quantity to the estimated event rate.

To optimize the accuracy of the method, it is possible to use a shifting parameter initialized to zero and then updated in each iteration of the scheme as a function of the difference between the metered sampling time and the quantized value of this sampling time. In at least some of the iterations (preferably all), this shift parameter is taken into account in counting down the sampling time.

Another aspect of the invention relates to telecommunication equipment, comprising means for transmitting and/or receiving traffic including successive data elements, means for detecting occurrences of data elements of a particular type in said traffic and coding means for outputting coding data reporting the time distribution of the occurrences detected, wherein the coding means are arranged to implement a method as defined hereinabove.

A third aspect of the invention concerns a computer program, loadable into a memory associated with a processor, and comprising code portions for implementing a method as defined hereinabove in the execution of said program by the processor.

DESCRIPTION OF PREFERRED EMBODIMENTS

Figure 3:
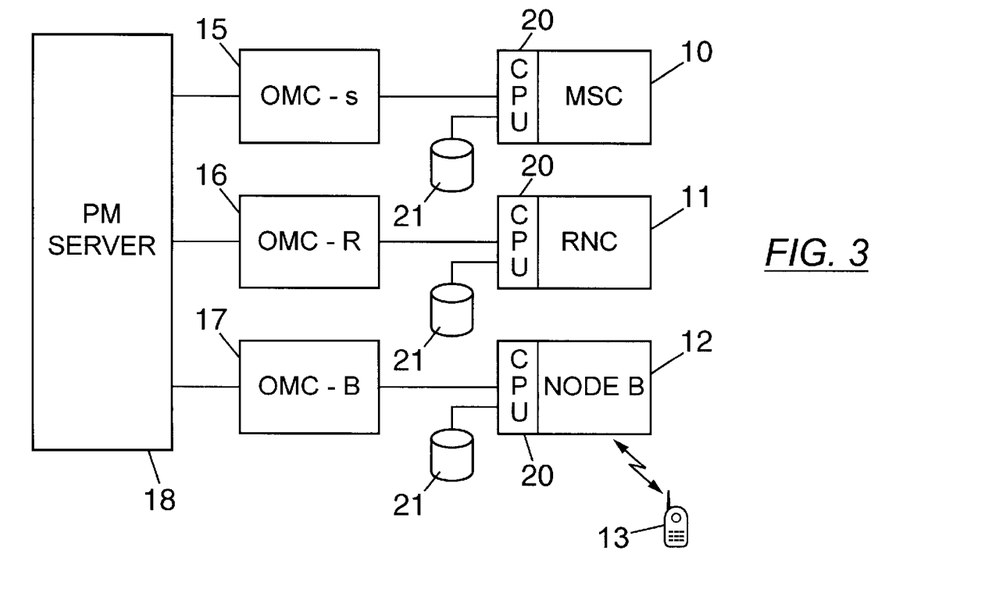
FIG. 3 is a schematic diagram of an exemplary telecommunication infrastructure to which the invention is applicable.

With reference to FIG. 3, the invention is illustrated in its application to the OAM facilities of a UMTS ("Universal Mobile Telecommunications System") type third-generation radio communication cellular network. In a known manner, such a network comprises switches 10, of MSC ("Mobile Switching Centre") type for the circuit mode or GSN ("GPRS Support Node") type for the packet mode, and a radio access network (RAN). The RAN comprises radio network controllers (RNC) 11 each linked to an MSC, and units 12 referred to as "node B" each linked to an RNC. Each node B 12 comprises one or more base stations providing radio links with the radio terminals 13.

Figure 1:
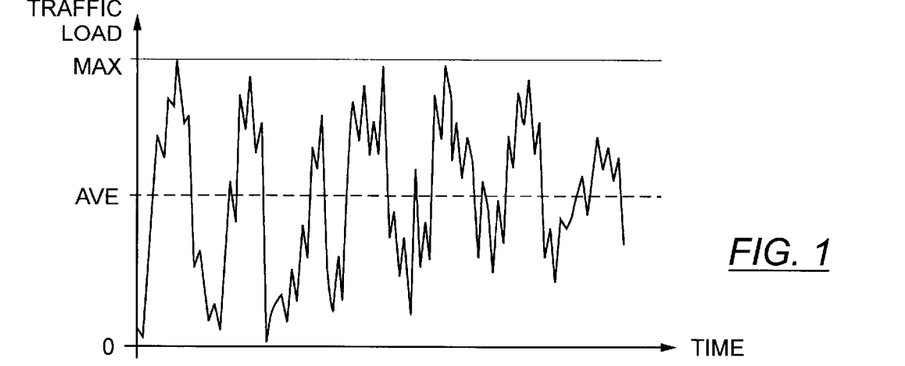
FIGS. 1 and 2, previously discussed, are graphs illustrating two exemplary traffic profiles.
Figure 2:
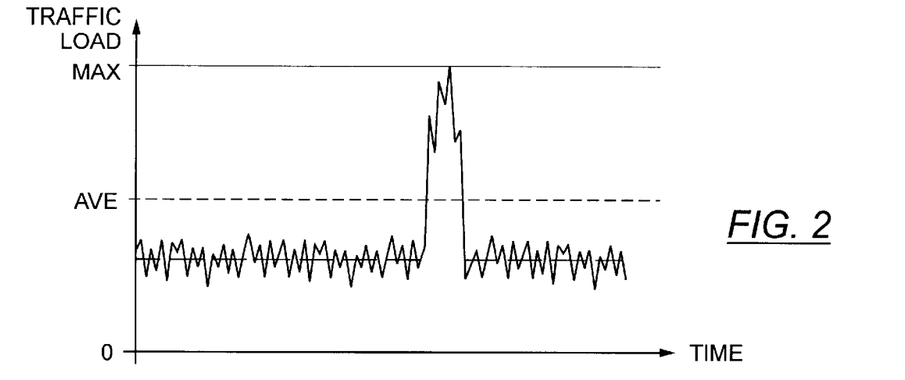

Each unit 10–12 of the network is associated with an operation and maintenance server 15–17 (OMC, "Operation and Maintenance Centre") having in particular the role of configuring it. In the example of FIG. 1, these servers 15–17 are called OMC-s for the MSCs 10, OMC-R for the RNCs 11 and OMC-B for the nodes B 12. For tracking the performance, the OMCs 15–17 are linked with a server 18 called the PM ("Performance Monitoring") server which processes the data collected with a view to their utilization by the network administrator. The OAM architectures and the corresponding interfaces in the UMTS networks are known and described in the technical specifications 3G TS 32.102 v3.2.0 ("3G Telecom Management Architecture, Release 1999"), 3G TS 32.104 v3.4.0 ("Telecommunication Management; 3G Performance Management, Release 1999"), and 3G TS 32.106-1 v3.1.0 ("Telecommunication Management; Configuration Management; Part 1: 3G Configuration Management: Concept and Requirements Release 1999") published by the 3GPP ("Third Generation Partnership Project").

The network elements, in particular the MSCs 10, RNCs 11 and nodes B 12, each comprise processors (CPU) 20 responsible among other things for network operating system functions (OSF). These processors 20 are configurable by the servers 15–17 for effecting the detection of a certain number of particular events, which may for example be occurrences of protocol data units (PDU) or of signaling messages of particular types, sent or received by the network element 10–12.

These processors 20 may be associated with local storage units 21 used in particular for the temporary recording of coding data generated in the course of the observation of the particular events, so as to subsequently report the time distribution of these events to the OAM servers 15–18.

Figure 4:
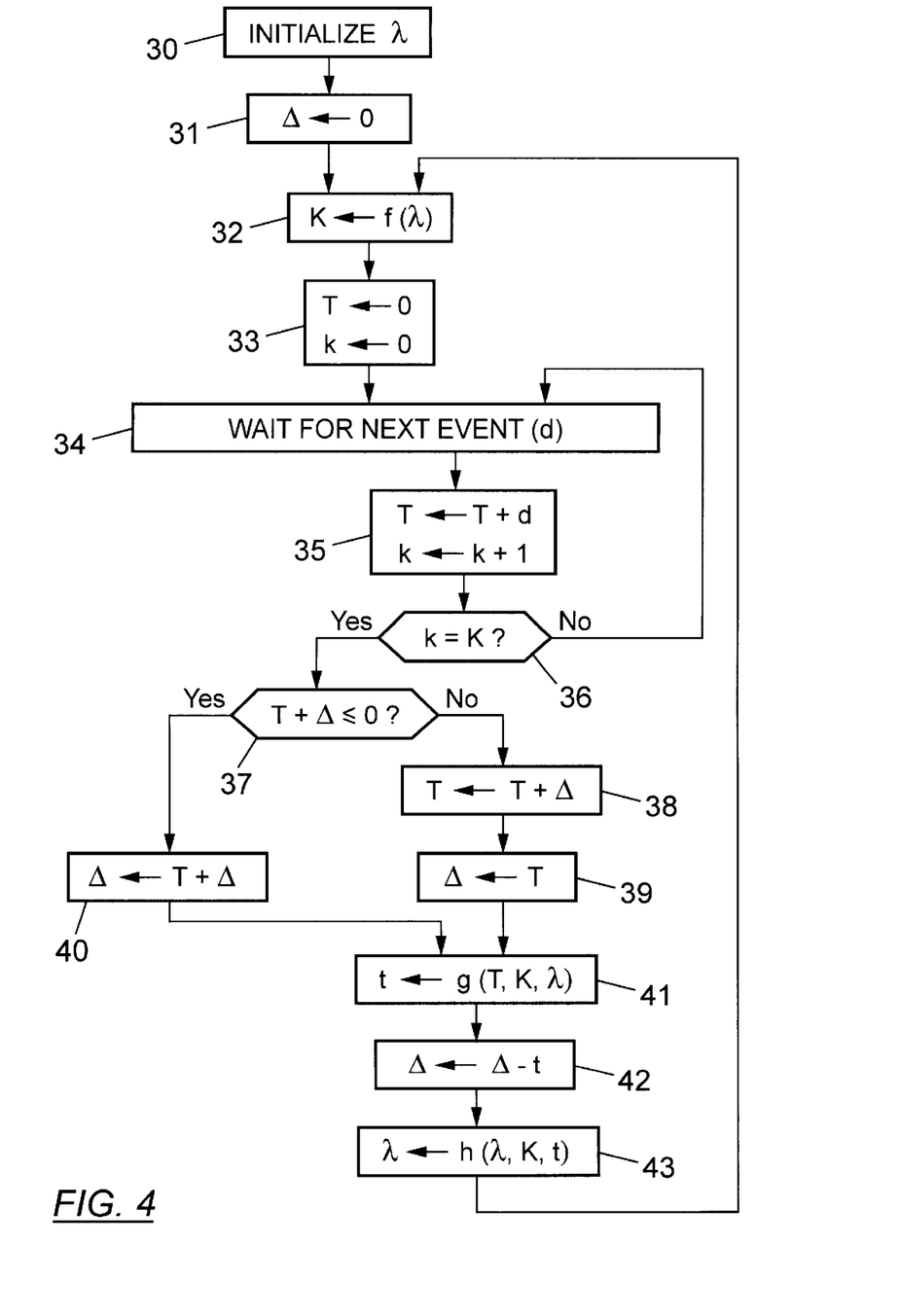
FIG. 4 is a flowchart of operations performed in an exemplary method in accordance with the invention.

The processing performed by the processor 20 of a network element 10–12 in order to structure the data to be provided to the OAM servers so as to report the detected events is for example in accordance with the procedure illustrated in FIG. 4.

This procedure uses an estimation $\lambda$ of the rate of the events, from which the sampling quantities $k_i$ are calculated. If the user (network administrator) has some idea of the overall average rate of the events to be detected, this value can be assigned to the parameter $\lambda$ during initialization 30. Otherwise, the estimated rate $\lambda$ is initialized to a low (but not zero) arbitrary value so that the estimation model adapts fairly rapidly.

The procedure of FIG. 4 also uses a shift parameter $\Delta$ serving to sharpen the accuracy of the measured sampling times. This shift parameter $\Delta$ is initialized to zero in step 31.

In step 32, the sampling quantity K ($=k_i$ during the i-th iteration) is calculated as a function of the current estimated event rate $\lambda$:

$$K = f(\lambda) \quad (1)$$

Preferably, this quantity K is proportional to the estimated rate $\lambda$, to within rounding errors. The function f can in particular be defined by:

$$f(\lambda) = \lceil Z.\lambda.n/S \rceil \quad (2)$$

where the parameters Z, n and S are fixed by the user and provided to the processor 20 by the OAM server 15–17 when execution of the method is instigated. The parameter Z is a total duration of observation of the events by the processor 20. The parameter n is a number of bits used to form the coding data representing a quantized value of the sampling time (for example n=8 for quantization on one byte). The parameter S represents a target for the size of file to be generated during the observation period Z, expressed as a number of bits (for example S=8192 (bits) for a target size of 1 kilobyte).

Before the first iteration of the loop represented in FIG. 4, the steps 30 and 32 lead to initializing the sampling quantity K=$k_1$. Each iteration leads to recalculating an estimated event rate $\lambda$, from which the next sampling quantity $k_{i+1}$ will be updated by reapplying the function f in step 32.

In each of these iterations, the variables T (sampling time) and k (event counter) are initialized to zero in step 33. The processor 20 then waits for the next event to be detected (step 34). When this next event occurs, after a measured duration d following the previous event, the variable T is increased by this duration d and the integer k is incremented by one unit in step 35. The processor then compares the integer k with the sampling quantity K ($=k_i$) during the test 36. If k<K, the procedure does not immediately require any other calculations and the processor simply returns to standby in expectation of the next event in step 34.

When k=K during test 36, the expected number of events has been reached, so that the processor 20 produces data for coding the metered sampling time. This sampling time is equal to the amount T+$\Delta$, unless the latter is negative. If T+$\Delta$>0 in test 37, the time T is therefore increased by $\Delta$ in step 38, and the same amount is temporarily assigned to the shift $\Delta$ in step 39. If T+$\Delta \leq 0$ in test 37, the value of T (>0) is not modified and that of the shift $\Delta$ (<0) is replaced by $\Delta$+T in step 40. The sampling time T is then quantized in step 41.

In the example of FIG. 4, the quantized value t of the sampling time T is calculated by applying a function g to the three variables T, K and $\lambda$. An example thereof will be described hereinbelow with reference to FIG. 5. The quantization step 41 comprises the production of coding data which characterize the quantized value t.

In the next step 42 of the loop, the shift parameter $\Delta$ is updated by deducting the quantized value t of the metered sampling time T from the temporary value of this parameter $\Delta$ as determined in step 39 or 40.

The event rate $\lambda$ is re-estimated in step 43 with the aid of a function h of three variables which consist of the previous value of the estimated rate $\lambda$, the current sampling quantity K and the quantized value t of the sampling time which has just been calculated in step 41. The processor updates the sampling quantity K in step 32 after this re-estimation 43 of the event rate $\lambda$.

An advantageous expression for the function h is:

$$h(\lambda, K, t) = (1-x).\lambda + x.K/t \quad (3)$$

where the weighting coefficient x is such that $0 < x \leq 1$. This coefficient x is for example provided to the processor 20 with the parameters defining the observation conditions. It may also be a coefficient which can be adapted as a function of the variability of the metered sampling times. Smaller values of x decrease the sensitivity of the estimator of the rate $\lambda$. In the limit case where x=1, which leads to taking $\lambda$=K/t, only the traffic of the current iteration is taken into account in estimating $\lambda$, this possibly leading to abrupt variations of the estimator. By way of example, the coefficient x can be taken as equal to 0.1.

It should be noted that other methods of estimating the event rate $\lambda$ may be used in step 43. For example, if the processor 20 holds in memory the aggregate sum $$S_i = \sum_{j=1}^{i} k_j$$

of the sampling quantities $k_j$ used successively in iterations j=1, 2, . . . , i as well as the aggregate sum $$S'_i = \sum_{j=1}^{i} t_j$$

of the quantized values $t_j$ of the corresponding sampling times, it can then calculate the event rate $\lambda = \lambda_{i+1}$ at the end of the i-th iteration in the form:

$$\lambda_{i+1} = S_i / S'_i \quad (4)$$

The estimator (3) is however preferable since it allows better tracking of the variations in the model while allowing its sensitivity to be adjusted.

Various methods can be used to quantize the sampling times T in step 39. A method which is simple but rather wasteful of memory space consists in outputting, as coding data, a floating point number representing a quantized value t equal to the metered sampling time T. In this case, a shift parameter Δ does not need to be taken into account.

Figure 5:
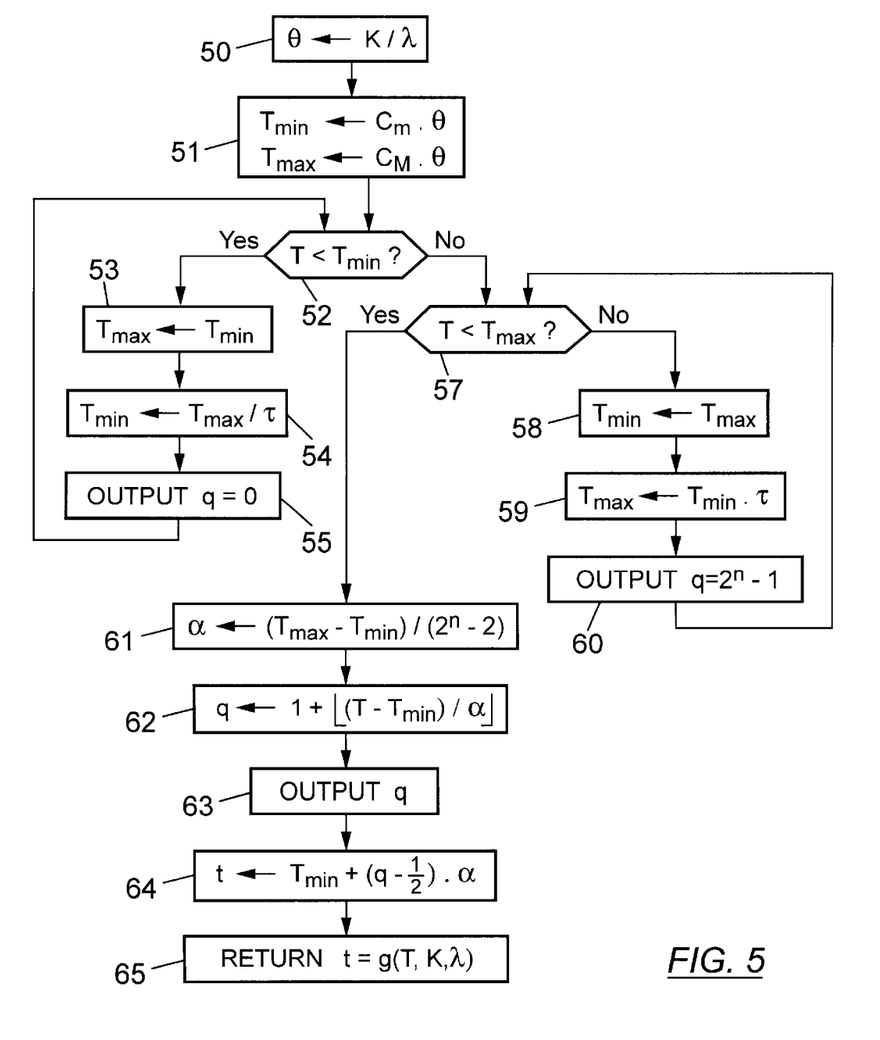
FIG. 5 is a flowchart of a procedure for quantizing the sampling times which can be used in the method according to FIG. 4.

FIG. 5 shows a preferred mode of quantizing the sampling times, which relies on a prediction time interval $[T_{min}, T_{max}[$ positioned initially with respect to a prediction value $\theta=K/\lambda$.

The quantization using n-bit indices, the prediction interval $[T_{min}, T_{max}[$ is divided into $2^n-2$ equidistributed segments of length:

$$\alpha = \frac{T_{max} - T_{min}}{2^n - 2} \tag{5}$$

When the sampling time T falls between $T_{min}$ and $T_{max}$, it is quantized by an n-bit index representing a number q lying between 1 and $2^n-2$, representative of the position of the time T in the prediction interval. This number q is given by:

$$q = 1 + \left\lfloor \frac{T - T_{min}}{\alpha} \right\rfloor \tag{6}$$

where, for a number y, $\lfloor y \rfloor$ represents the integer equal to or immediately less than y. The corresponding quantized value t, which achieves an approximation of the sampling time T, is then given by:

$$t = T_{min} + \left(q - \frac{1}{2}\right) \cdot \alpha \tag{7}$$

When the sampling time T is less than $T_{min}$, the prediction interval $[T_{min}, T_{max}[$ is shifted leftwards and the index q=0 is output. When the sampling time T is greater than $T_{max}$, the prediction interval $[T_{min}, T_{max}[$ is shifted rightwards and the index $q=2^n-1$ is output.

With reference to FIG. 5, this procedure for quantizing the sampling time T commences in step 50 with the calculation of the prediction value $\tau=K/\lambda$, from which are deduced the bounds of the initial prediction interval: $T_{min}=c_m \cdot \theta$ and $T_{max}=c_M \cdot \theta$ (step 51). By way of example, we can take $c_M=1/c_m=5$.

In test 52, the sampling time T to be quantized is compared with the lower bound $T_{min}$ of the prediction interval. If $T<T_{min}$, the prediction interval is replaced by a new time interval situated immediately below the preceding interval, it being possible to do this by replacing $T_{max}$ by $T_{min}$ in step 53 then by taking $T_{min}=T_{max}/\tau$ in step 54. The index q=0 is then output in step 55 before carrying out test 52 again. When $T \geq T_{min}$ in test 52, another test 57 is performed to compare the sampling time T with the upper bound $T_{max}$ of the prediction interval. If $T \geq T_{max}$, the prediction interval is replaced by a new time interval situated immediately above the preceding interval, it being possible to do this by replacing $T_{min}$ by $T_{max}$ in step 58 then by taking $T_{max}=T_{min} \cdot \tau$ in step 59. The index $q=2^n-1$ is then output in step 60 before carrying out test 57 again. The number τ is for example equal to 5.

When $T_{min} \leq T < T_{max}$, the number α is calculated according to relation (5) in step 61, then the index q is calculated according to relation (6) in step 62. This index q is output in step 63, after which the quantized value t is calculated according to relation (7) in step 64. This value $t=g(T, K, \lambda)$ is returned in step 65 so as to terminate execution of the function of step 41 of FIG. 4. The execution of this function has produced one or more values of the index q which characterize the quantization value t once the prediction value $\tau=K/\lambda$ is known. This or these indices q are written successively by the processor 20 to the associated memory 21.

On completion of the procedure of FIG. 4, which terminates when the specified duration Z has elapsed, the coding data file is composed of a succession of n-bit values representing the string of indices q. With the initialization value $k_1=f(\lambda_1)$, this string makes it possible to retrieve the set of pairs $(k_i, t_i)$.

Figure 6:
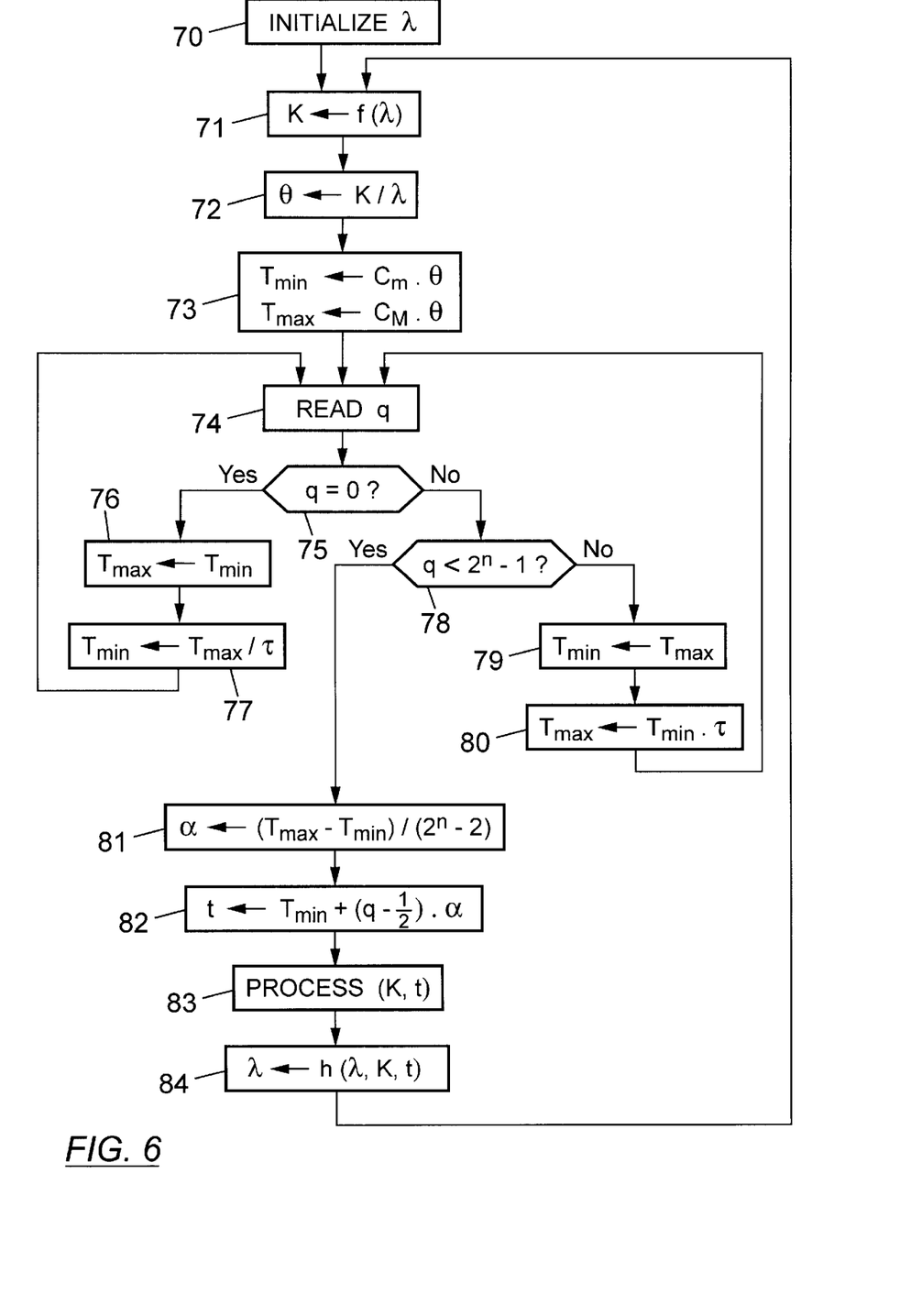
FIG. 6 is a flowchart of a procedure for decoding the data generated by a method according to FIGS. 4 and 5.

The recovery of this information is typically performed by the PM server 18 to which the file containing the string of indices q is addressed. The corresponding procedure is illustrated by FIG. 6.

This procedure commences with the initialization of the number $K=k_1$. Firstly, (step 70), the estimated rate $\lambda=\lambda_1$ is initialized in the same way as in step 30 of FIG. 4, then in step 71, the sampling quantity $K=f(\lambda)$ is calculated as in step 32 of FIG. 4.

The prediction value θ of the sampling time T is calculated in step 72 according to $\theta=K/\lambda$ then, in step 73, the bounds of the prediction interval are determined: $T_{min}=c_m \cdot \theta$ and $T_{max}=c_M \cdot \theta$.

The next index q of the file is then read in step 74. If this index q is equal to 0 (test 75), the prediction interval is shifted leftwards by replacing $T_{max}$ by $T_{min}$ in step 76, then $T_{min}$ by $T_{max}/\tau$ in step 77, after which the scheme returns to step 74 to read the next value of the index q. If $q=2^n-1$ (test 78), the prediction interval is shifted rightwards by replacing $T_{min}$ by $T_{max}$ in step 79, then $T_{max}$ by $T_{min} \cdot \tau$ in step 80, after which the scheme returns to step 74 to read the next value of the index q.

When $1 \leq q \leq 2^n-2$, the quantities α and t are calculated in steps 81 and 82 respectively according to relations (5) and (7). Accordingly, the PM server has available the pair $(k_i, t_i)=(K, t)$, K having been calculated in step 71 and t in step 82. This pair (K, t) forms the subject of a processing in step 83. Various types of possible processing are set forth hereinbelow. In step 84, the estimated event rate λ is recalculated in the same way as in step 43 of FIG. 4, then the scheme of FIG. 6 returns to the aforesaid step 71. This scheme stops when the file of indices q is exhausted.

The processing of a pair (K, t) in step 83 can consist simply in storing this pair with a view to subsequent calculations. It can also consist in calculating aggregate values making it possible, at the end of the decoding of the file, to obtain statistical indicators such as averages, variances, etc.

Figure 7:
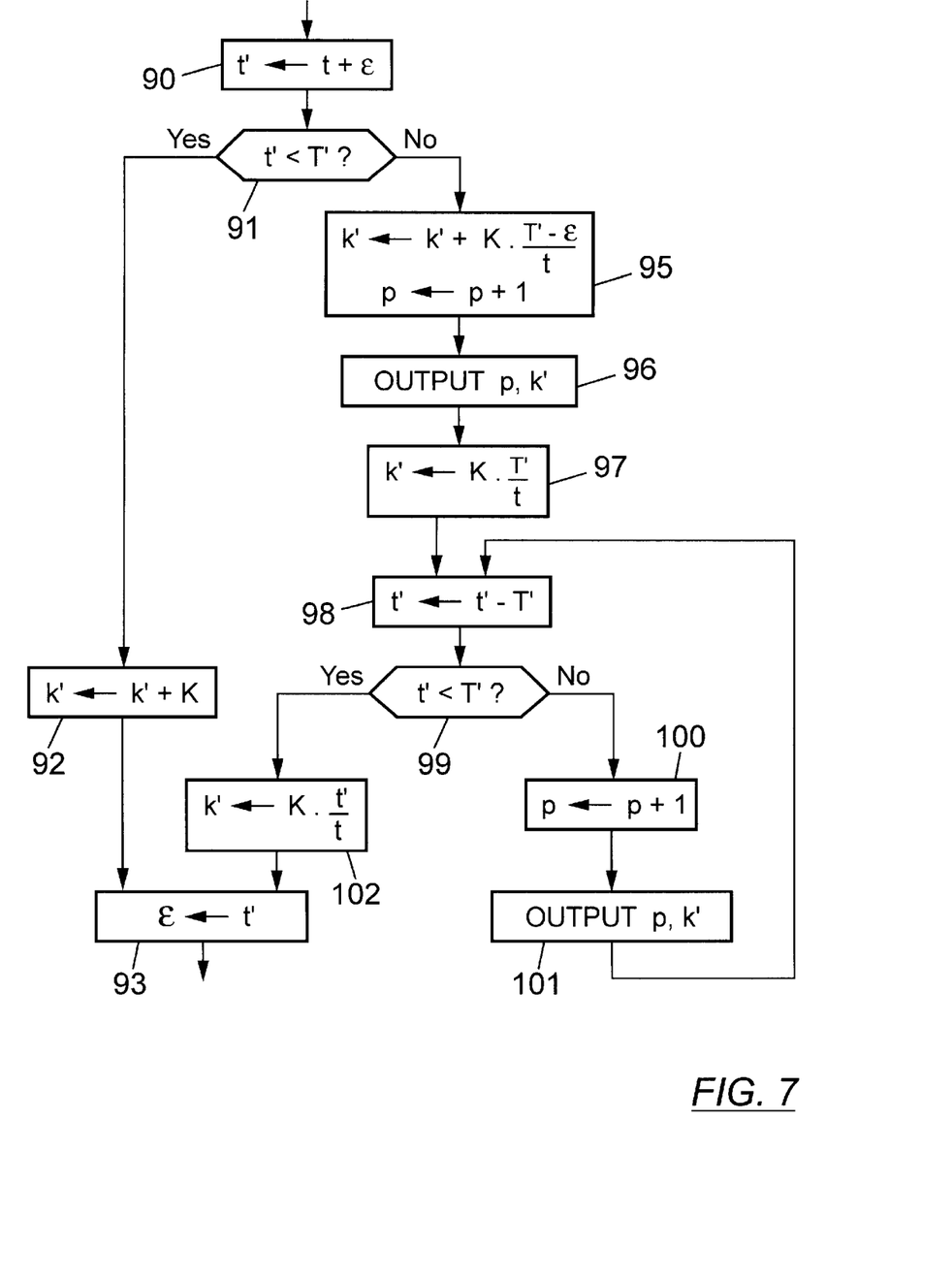
FIG. 7 is a flowchart of a procedure which can be used in conjunction with that of FIG. 6 for restoring traffic histograms with a constant time step.

This processing can also consist in recompiling a traffic histogram with a uniform time step T'. FIG. 7 illustrates the corresponding operations performed within step 83 of FIG. 6.

This processing consists essentially in performing linear interpolations of the sampling quantities $k_i$ when the successive intervals of duration $t_i$ are not aligned with the regular intervals of duration T'. It uses an interpolation variable $\epsilon \geq 0$ which, in the course of the i-thiteration of the procedure of FIG. 6, represents the time shift $$\sum_{j=1}^{i-1} t_j - T' \cdot \left\lfloor \sum_{j=1}^{i-1} t_j / T' \right\rfloor.$$

The regular time intervals of duration T' are enumerated by an index p. The event counter is denoted k' in the procedure of FIG. 7. The quantities ε, p and k' are set to zero in the initialization step 70 of the procedure of FIG. 6.

At the start of the processing 83 (step 90 of FIG. 7), a corrected time t'=t+ε is determined. This corrected time t' is compared with the time step T' during test 91. If t'<T', the processing 83 consists simply in increasing the counter k' by K (step 92), then in assigning the value of the time t' to the variable ε (step 93).

If t'≧T' during test 91, the counter k' is increased by a fraction of the sampling quantity K, i.e. by K.(T'−ε)/t, and the index p is incremented by one unit in step 95. In the next step 96, the p-th value of the histogram is output as being the current value of the counter k'. This counter k' then receives the value K.T'/t in step 97. In the next step 98, the time step of the histogram T' is subtracted from the corrected time t'. After this subtraction, if t'≧T' (test 99), the index p is incremented by one unit in step 100, then the p-th value of the histogram is output in step 101 as being k'=K.T'/t. After this step 101, the scheme returns to the aforesaid step 98.

When t'<T' in test 99, there is no longer any histogram value to be output in the course of the current iteration. The counter k' is updated by assigning it the value K.t'/t in step 102, then the value of the time t' is assigned to the variable ε in step 93.

We claim:

1. A method for reporting a time distribution of a succession of specified events, comprising an initialization of a sampling quantity consisting of a positive integer and a plurality of successive iterations of a scheme comprising the steps of:
    detecting a number of events equal to the sampling quantity and metering a sampling time taken to detect said number of events;
    quantizing the sampling time metered in the preceding step to output coding data representing a quantized value of said sampling time; and
    updating the sampling quantity as a function of parameters including said quantized value of the sampling time.

2. A method according to claim 1, wherein the step of updating the sampling quantity comprises calculating an estimated event rate as a function of parameters including a preceding sampling quantity and the quantized value of the sampling time, whereby the updated sampling quantity is deduced from the estimated event rate.

3. A method according to claim 2, wherein the estimated event rate is calculated in the form $(1-x).\lambda+x.K/t$, where x is a weighting coefficient lying between 0 and 1, $\lambda$ is the estimated event rate in force before the current iteration, K is the preceding sampling quantity and t is the quantized value of the sampling time.

4. A method according to claim 2, wherein the event rate estimated in an i-th iteration of the scheme (i≧1) is calculated in the form $$\left(\sum_{j=1}^{i} k_j\right) / \left(\sum_{j=1}^{i} t_j\right),$$

where $k_j$ is the sampling quantity used in a j-th iteration and $t_j$ is the quantized value of the sampling time metered in the j-th iteration (1≦j≦i).

5. A method according to claim 2, wherein the updated sampling quantity is an integer substantially proportional to the estimated event rate.

6. A method according to claim 5, wherein the updated sampling quantity is equal to $\lceil Z.\lambda.n/S \rceil$, where Z is a predefined total duration of observation, $\lambda$ is the estimated event rate, n is a number of bits used to form coding data representing a quantized time value, S is a predefined data size expressed as a number of bits, and $\lceil y \rceil$ represents the integer equal to or immediately greater than a number y.

7. A method according to claim 1, wherein the step of quantizing the sampling time comprises producing coding data including at least one index of n bits, n being a predefined integer greater than 3, and wherein the producing of said coding data comprises the steps of:
    determining a prediction time interval;
    if the sampling time is below the prediction interval, outputting an index having a first value and replacing the prediction interval by a new time interval situated immediately below the preceding interval;
    if the sampling time is above the prediction interval, outputting an index having a second value distinct from the first value and replacing the prediction interval by a new time interval situated immediately above the preceding interval; and
    if the sampling time is within the prediction interval, outputting an index having a value distinct from the first and second values and representative of the position of the sampling time in the prediction interval.

8. A method according to claim 7, wherein the step of updating the sampling quantity comprises calculating an estimated event rate as a function of parameters including the preceding sampling quantity and the quantized value of the sampling time, whereby the updated sampling quantity is deduced from the estimated event rate, and wherein the prediction time interval initially determined is positioned with respect to a prediction value equal to a ratio of the sampling quantity to the estimated event rate.

9. A method according to claim 1, wherein a shift parameter is initialized to zero and, in each iteration of said scheme, the shift parameter is updated as a function of a difference between the metered sampling time and the quantized value of said sampling time, and wherein the shift parameter is involved in counting down the sampling time in at least some of the iterations.

10. A method according to claim 1, wherein the quantizing of the sampling time consists in outputting, as coding data, a number expressed in floating point representing a quantized value equal to the metered sampling time.

11. Telecommunication equipment, comprising means for transmitting and/or receiving traffic including successive data elements, means for detecting occurrences of data elements of a particular type in said traffic and coding means for outputting coding data reporting a time distribution of the occurrences detected, wherein the coding means comprise means for initializing a sampling quantity consisting of a positive integer and iterative processing means including:
    means for metering a sampling time taken in one iteration to detect a number of events equal to the sampling quantity;
    means for quantizing the sampling time metered in said iteration to output coding data representing a quantized value of said sampling time; and
    means for updating the sampling quantity for a next iteration as a function of parameters including said quantized value of the sampling time.

12. Telecommunication equipment according to claim 11, wherein the means for updating the sampling quantity comprise means for calculating an estimated event rate as a function of parameters including a preceding sampling quantity and the quantized value of the sampling time, whereby the updated sampling quantity is deduced from the estimated event rate.

13. Telecommunication equipment according to claim 12, wherein the estimated event rate is calculated in the form $(1-x).\lambda+x.K/t$, where x is a weighting coefficient lying between 0 and 1, $\lambda$ is the estimated event rate in force before said iteration, K is the preceding sampling quantity and t is the quantized value of the sampling time.

14. Telecommunication equipment according to claim 12, wherein the event rate estimated in an i-th iteration ($i \geqq 1$) is calculated in the form $$\left(\sum_{j=1}^{i} k_j\right) \Big/ \left(\sum_{j=1}^{i} t_j\right),$$

where $k_j$ is the sampling quantity used in a j-th iteration and $t_j$ is the quantized value of the sampling time metered in the j-th iteration ($1 \leqq j \leqq i$).

15. Telecommunication equipment according to claim 12, wherein the updated sampling quantity is an integer substantially proportional to the estimated event rate.

16. Telecommunication equipment according to claim 15, wherein the updated sampling quantity is equal to $[Z.\lambda.n/S]$, where Z is a predefined total duration of observation, $\lambda$ is the estimated event rate, n is a number of bits used to form coding data representing a quantized time value, S is a predefined data size expressed as a number of bits, and $[y]$ represents the integer equal to or immediately greater than a number y.

17. Telecommunication equipment according to claim 1, wherein the means for quantizing the sampling time comprise means for producing coding data including at least one index of n bits, n being a predefined integer greater than 3, and wherein the means for producing said coding data comprises:

means for determining a prediction time interval;

means for outputting an index having a first value if the sampling time is below the prediction interval, and for replacing the prediction interval by a new time interval situated immediately below the preceding interval;

means for outputting an index having a second value distinct from the first value if the sampling time is above the prediction interval, and for replacing the prediction interval by a new time interval situated immediately above the preceding interval; and means for outputting an index having a value distinct from the first and second values if the sampling time is within the prediction interval, said index being representative of the position of the sampling time in the prediction interval.

18. Telecommunication equipment according to claim 17, wherein the means for updating the sampling quantity comprise means for calculating an estimated event rate as a function of parameters including the preceding sampling quantity and the quantized value of the sampling time, whereby the updated sampling quantity is deduced from the estimated event rate, and wherein the prediction time interval initially determined is positioned with respect to a prediction value equal to a ratio of the sampling quantity to the estimated event rate.

19. Telecommunication equipment according to claim 11, wherein a shift parameter is initialized to zero and, in each iteration, the shift parameter is updated as a function of a difference between the metered sampling time and the quantized value of said sampling time, and wherein the shift parameter is involved in counting down the sampling time in at least some of the iterations.

20. Telecommunication equipment according to claim 11, wherein the means for quantizing the sampling time comprise means for outputting, as coding data, a number expressed in floating point and representing a quantized value equal to the metered sampling time.

21. A computer program product, loadable into a memory associated with a processor, and comprising code portions for implementing, in an execution of said program by the processor, a method for reporting a time distribution of a succession of specified events, comprising an initialization of a sampling quantity consisting of a positive integer and a plurality of successive iterations of a scheme comprising the steps of:

detecting a number of events equal to the sampling quantity and metering a sampling time taken to detect said number of events;

quantizing the sampling time metered in the preceding step to output coding data representing a quantized value of said sampling time; and updating the sampling quantity as a function of parameters including said quantized value of the sampling time.

22. A computer program product according to claim 21, wherein the step of updating the sampling quantity comprises calculating an estimated event rate as a function of parameters including a preceding sampling quantity and the quantized value of the sampling time, whereby the updated sampling quantity is deduced from the estimated event rate.

23. A computer program product according to claim 22, wherein the estimated event rate is calculated in the form $(1-x).\lambda+x.K/t$, where x is a weighting coefficient lying between 0 and 1, $\lambda$ is the estimated event rate in force before the current iteration, K is the preceding sampling quantity and t is the quantized value of the sampling time.

24. A computer program product according to claim 22, wherein the event rate estimated in an i-th iteration of the scheme ($i \geqq 1$) is calculated in the form $$\left(\sum_{j=1}^{i} k_j\right) \Big/ \left(\sum_{j=1}^{i} t_j\right),$$

where $k_j$ is the sampling quantity used in a j-th iteration and $t_j$ is the quantized value of the sampling time metered in the j-th iteration ($1 \leqq j \leqq i$).

25. A computer program product according to claim 22, wherein the updated sampling quantity is an integer substantially proportional to the estimated event rate.

26. A computer program product according to claim 25, wherein the updated sampling quantity is equal to $[Z.\lambda.n/S]$, where Z is a predefined total duration of observation, $\lambda$ is the estimated event rate, n is a number of bits used to form coding data representing a quantized time value, S is a predefined data size expressed as a number of bits, and $[y]$ represents the integer equal to or immediately greater than a number y.

27. A computer program product according to claim 21, wherein the step of quantizing the sampling time comprises producing coding data including at least one index of n bits, n being a predefined integer greater than 3, and wherein the producing of said coding data comprises the steps of:

determining a prediction time interval;

if the sampling time is below the prediction interval, outputting an index having a first value and replacing the prediction interval by a new time interval situated immediately below the preceding interval;

if the sampling time is above the prediction interval, outputting an index having a second value distinct from the first value and replacing the prediction interval by a new time interval situated immediately above the preceding interval; and if the sampling time is within the prediction interval, outputting an index having a value distinct from the first and second values and representative of the position of the sampling time in the prediction interval.

28. A computer program product according to claim 27, wherein the step of updating the sampling quantity comprises calculating an estimated event rate as a function of parameters including the preceding sampling quantity and the quantized value of the sampling time, whereby the updated sampling quantity is deduced from the estimated event rate, and wherein the prediction time interval initially determined is positioned with respect to a prediction value equal to a ratio of the sampling quantity to the estimated event rate.

29. A computer program product according to claim 21, wherein a shift parameter is initialized to zero and, in each iteration of said scheme, the shift parameter is updated as a function of a difference between the metered sampling time and the quantized value of said sampling time, and wherein the shift parameter is involved in counting down the sampling time in at least some of the iterations.

30. A computer program product according to claim 21, wherein the quantizing of the sampling time consists in outputting, as coding data, a number expressed in floating point representing a quantized value equal to the metered sampling time.

* * * * *